United States Patent
Kobayashi

(10) Patent No.: US 8,437,231 B2
(45) Date of Patent: May 7, 2013

(54) SERVO CONTROL DEVICE AND OPTICAL DISC DEVICE

(75) Inventor: Nobuyoshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/533,378

(22) Filed: Jun. 26, 2012

(65) Prior Publication Data

US 2013/0028064 A1  Jan. 31, 2013

(30) Foreign Application Priority Data

Jul. 28, 2011 (JP) ................. 2011-165789

(51) Int. Cl.
*G11B 7/00* (2006.01)
(52) U.S. Cl.
USPC ............ 369/44.41; 369/59.22; 369/44.28; 369/44.29
(58) Field of Classification Search ........... 369/44.41, 369/44.29, 44.28
See application file for complete search history.

(56) References Cited

U.S. PATENT DOCUMENTS

| | | | |
|---|---|---|---|
| 5,729,517 A * | 3/1998 | Fujiwara et al. ......... | 369/59.22 |
| 6,236,628 B1 * | 5/2001 | Kim ..................... | 369/44.41 |
| 6,741,533 B1 * | 5/2004 | Hiratsuka et al. ....... | 369/44.41 |
| 2006/0209991 A1 * | 9/2006 | Oshikubo et al. ........ | 375/330 |
| 2009/0003167 A1 * | 1/2009 | Kobayashi ............. | 369/53.12 |

FOREIGN PATENT DOCUMENTS

| | | |
|---|---|---|
| JP | 2001-067690 | 3/2001 |
| JP | 2006-260645 | 9/2006 |
| JP | 2009-009660 | 1/2009 |

* cited by examiner

*Primary Examiner* — Van Chow
(74) *Attorney, Agent, or Firm* — Rader, Fishman & Grauer PLLC

(57) ABSTRACT

A servo control device includes a plurality of reproduction channels, a plurality of analog/digital (A/D) converters, a servo error detecting circuit that generates a servo error signal, a servo signal processing device that executes predetermined processing for the servo error signal to generate a control signal, and a sampling frequency converter that converts the sampling frequency between the servo error detecting circuit and the servo signal processing device. A first clock is included as a sampling clock of the A/D converters and a processing clock of the servo error detecting circuit. A second clock is included as a processing clock of the servo signal processing device. The sampling frequency converter converts the sampling frequency by processing the servo error signal by the servo error detecting circuit in synchronization with the first clock and processing the signal processed in synchronization with the first clock in synchronization with the second clock.

11 Claims, 8 Drawing Sheets

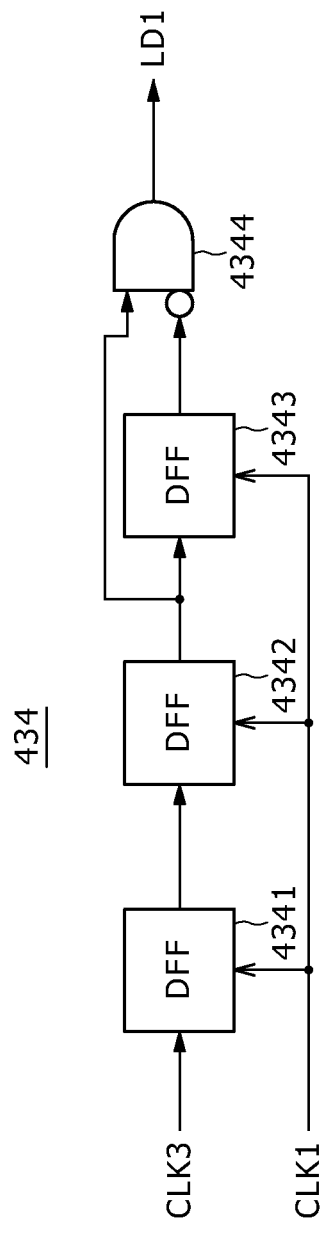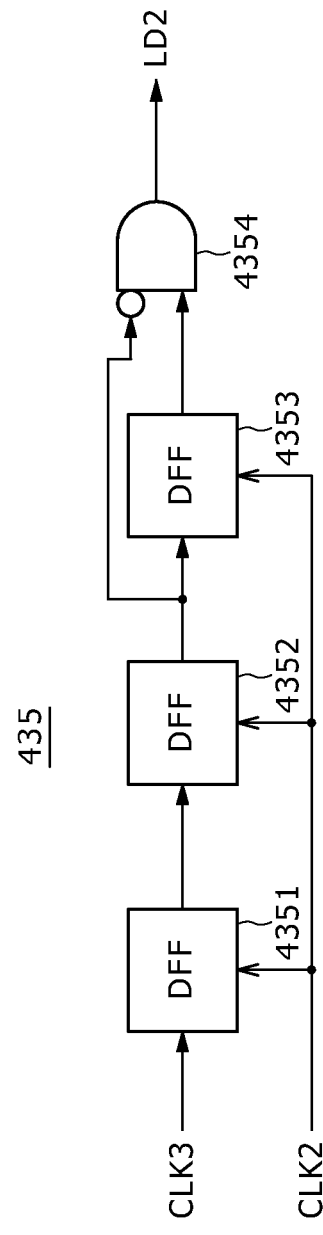
F I G. 4A
F I G. 4B

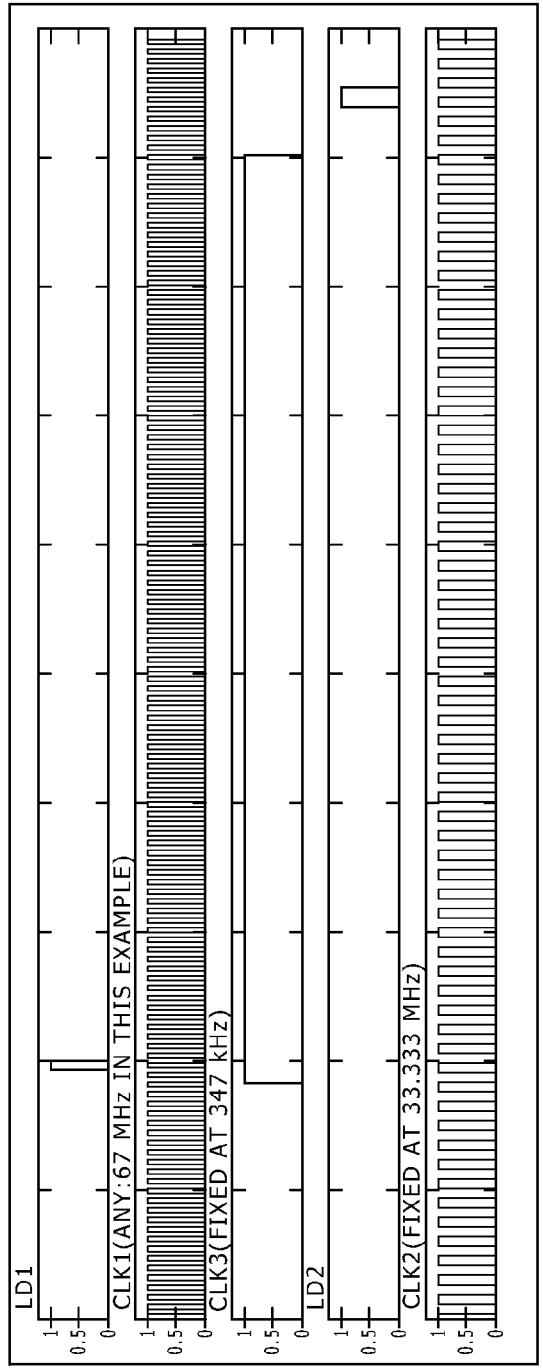

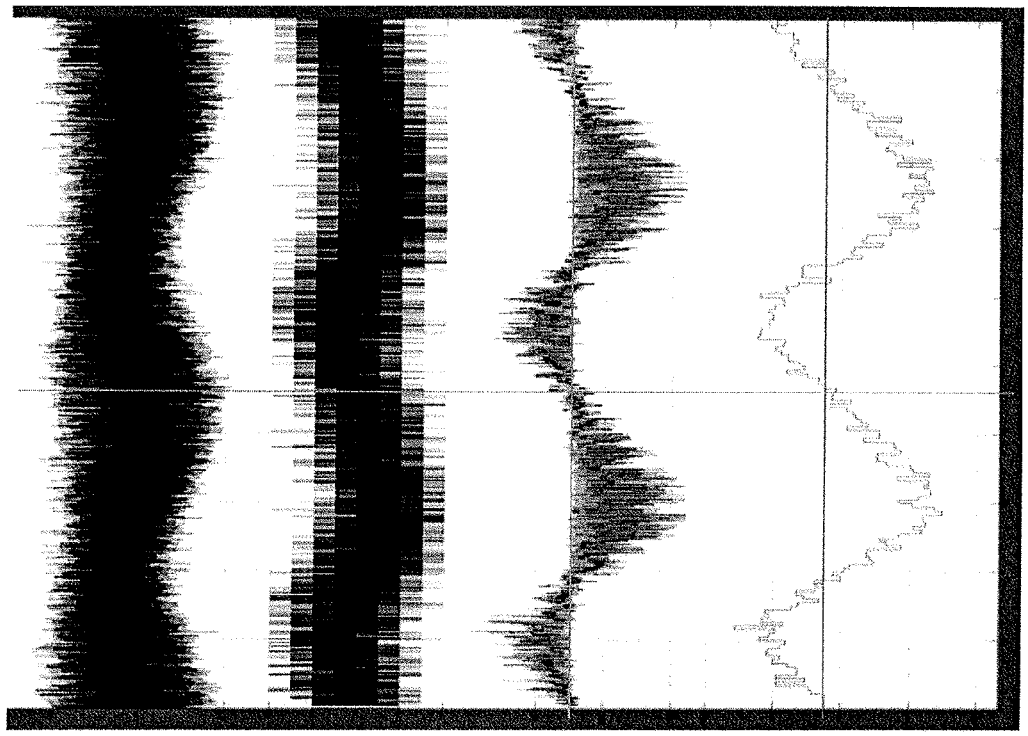
FIG. 6A RF(A,B,C,D)sum
FIG. 6B Integrator Input: $\varphi$
FIG. 6C Integrator Output: $\int \varphi(t)dt$
FIG. 6D FIRST AND SECOND DUMPER Output:TE

SERVO CONTROL DEVICE AND OPTICAL DISC DEVICE

BACKGROUND

The present technique relates to servo control device and optical disc device including a differential phase detection (DPD) circuit for detection of a tracking error (TE) signal for example.

In the optical disc controller large-scale integration (LSI), equipping of the DPD circuit is indispensable for tracking error (TE) signal detection in a read only memory (ROM) disc such as Blu-ray disc (BD) and digital versatile disc (DVD).

Although the DPD circuit is based on a full-analog configuration in the past, digital DPD is coming to be employed in recent years for circuit scale reduction and power consumption suppression in a high-density process (refer to e.g. Japanese Patent Laid-opens No. 2006-260645, No. 2001-67690, and No. 2009-9660).

In the servo system employing the digital DPD, the sampling frequency (fs) of analog/digital (A/D) conversion for DPD needs to be a fixed frequency synchronized with the servo system clock because servo control is carried out by a servo digital signal processor (DSP).

Furthermore, because of the sampling theorem, the sampling frequency fs needs to be kept at least twice the radio frequency (RF) maximum repetition frequency (repeated minimum toggle runlength (rmtr)).

SUMMARY

However, if the system is compatible with the constant angular velocity (CAV) system, the system needs to meet full seeking from the innermost circumference to the outermost circumference (RF frequency 2.4 times), and the sampling frequency fs that is unnecessarily high (at least 4.8 times rmtr) in terms of circuit implementation and power consumption is necessary.

Thus, the power consumption of the whole servo system becomes higher.

There is a need for the present technique to provide servo control device and optical disc device that enable reduction in the power consumption of the whole servo system without requiring a sampling frequency that is unnecessarily high.

According to an embodiment of the present technique, there is provided a servo control device including a plurality of reproduction channels configured to reproduce information of a recording medium and a plurality of analog/digital (A/D) converters configured to perform sampling and quantization of a plurality of input signals of the plurality of reproduction channels, correspondingly. The servo control device further includes a servo error detecting circuit configured to execute predetermined processing for the plurality of input signals digitized by the A/D converters to generate a servo error signal, a servo signal processing device configured to execute predetermined processing for the servo error signal to generate a control signal for servo system control, and a sampling frequency converter configured to convert the sampling frequency between the servo error detecting circuit and the servo signal processing device. A first clock is included as a sampling clock of the A/D converters and a processing clock of the servo error detecting circuit. A second clock is included as a processing clock of the servo signal processing device. The sampling frequency converter converts the sampling frequency by processing the servo error signal by the servo error detecting circuit in synchronization with the first clock and processing the signal processed in synchronization with the first clock in synchronization with the second clock.

According to an embodiment of the present technique, there is provided an optical disc device including a plurality of reproduction channels configured to reproduce information of an optical disc by an optical section and a plurality of analog/digital (A/D) converters configured to perform sampling and quantization of a plurality of input signals of the plurality of reproduction channels, correspondingly. The optical disc device further includes a servo error detecting circuit configured to execute predetermined processing for the plurality of input signals digitized by the A/D converters to generate a servo error signal, a servo signal processing device configured to execute predetermined processing for the servo error signal to generate a control signal for servo system control, and a sampling frequency converter configured to convert the sampling frequency between the servo error detecting circuit and the servo signal processing device. A first clock is included as a sampling clock of the A/D converters and a processing clock of the servo error detecting circuit. A second clock is included as a processing clock of the servo signal processing device. The sampling frequency converter converts the sampling frequency by processing the servo error signal by the servo error detecting circuit in synchronization with the first clock and processing the signal processed in synchronization with the first clock in synchronization with the second clock.

According to the embodiments of the present technique, the power consumption of the whole servo system can be reduced without requiring a sampling frequency that is unnecessarily high.

BRIEF DESCRIPTION OF THE DRAWINGS

FIGS. 4A and 4B are diagrams showing a configuration example of generators of first and second enable signals in the sampling frequency converter;

FIGS. 5A to 5E are diagrams showing a waveform example of a first clock, a second clock, a third clock, the first enable signal, and the second enable signal used in the sampling frequency converter according to the embodiment;

FIGS. 6A to 6D are diagrams showing the input/output waveforms of the respective sections in the sampling frequency converter according to the embodiment;

DETAILED DESCRIPTION OF THE PREFERRED EMBODIMENT

An embodiment of the present technique will be described below in association with the drawings.

The order of the description is as follows.
1. Configuration Example of Optical Disc Device
2. Configuration Example of Servo Control Device
3. Configuration Example of Sampling Frequency Converter 4. Configuration Example of TE Detecting Circuit of DPD System <1. Configuration Example of Optical Disc Device>

Figure 1:
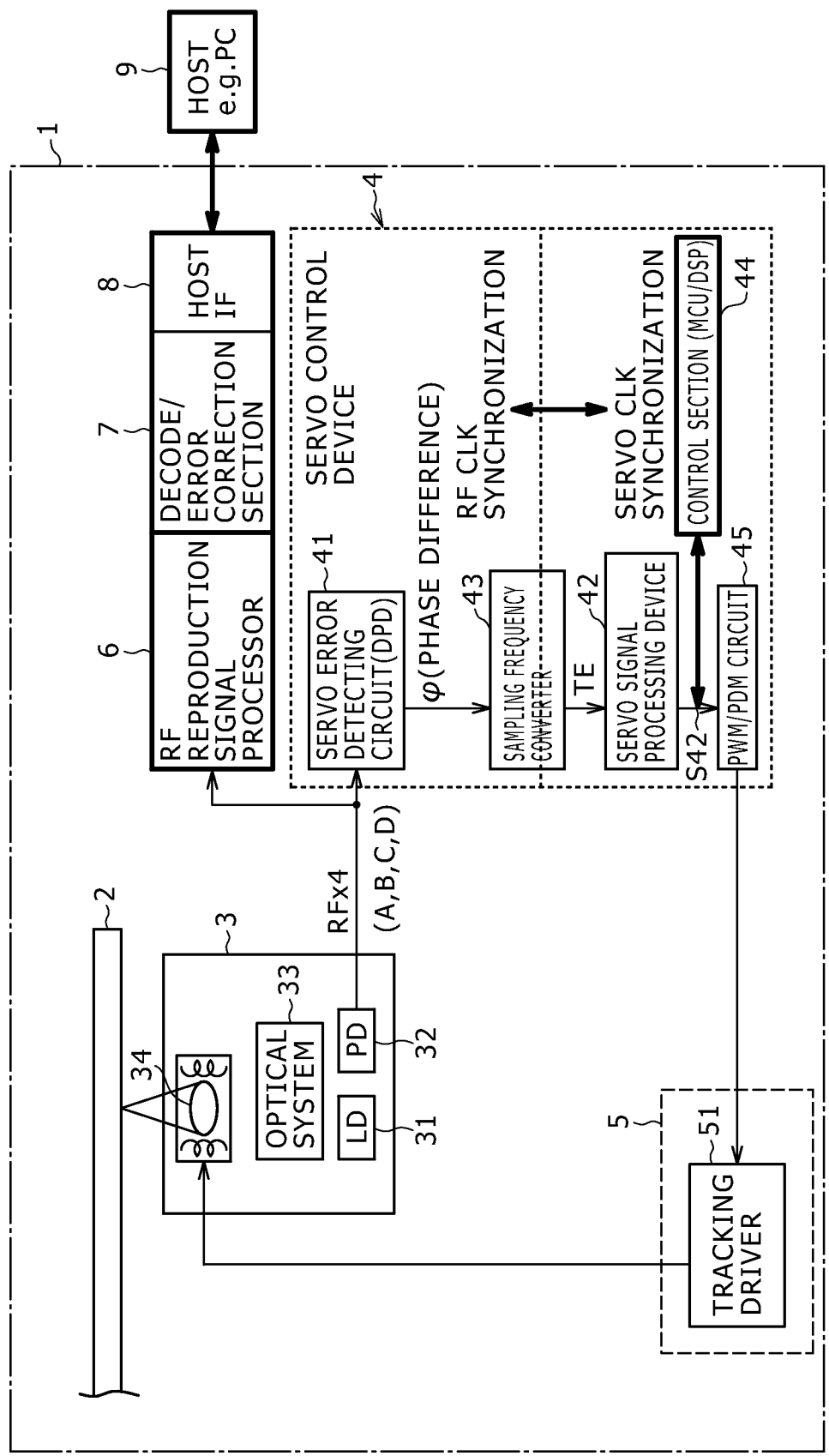
FIG. 1 is a diagram showing a configuration example of an optical disc device capable of employing a servo control device according to an embodiment of the present technique.

FIG. 1 is a diagram showing a configuration example of an optical disc device (optical recording/reproducing device) capable of employing a servo control device according to the present embodiment.

As shown in FIG. 1, this optical disc device 1 has a recording medium, e.g. an optical disc 2, an optical pick-up (optical head) 3, a servo control device 4, a drive section 5, an RF reproduction signal processor 6, a decode/error correction section 7, and a host interface (IF) 8.

In FIG. 1, a processing system of a tracking error signal (TE signal) is shown and a processing system of a focus error signal is omitted.

The optical pick-up 3 has a laser diode 31 that is driven by a laser drive circuit and is used for recording and reproducing digital data, a light receiving element 32 that detects laser light radiated by the laser diode 31, an optical system 33, an objective lens 34, and so forth.

The servo control device 4 includes a servo error detecting circuit 41, a servo signal processing device 42 including a servo filter and so forth, a sampling frequency converter 43, a control section 44 such as micro controller unit (MCU) and DSP, and a pulse width modulation (PWM)/ pulse density modulation (PDM) circuit 45 that carries out PWM (or PDM) control of the drive section 5.

Details of this servo control device 4 will be described later.

The drive section 5 has a tracking driver 51 and drives the tracking mechanism section of the objective lens 34.

The RF reproduction signal processor 6 executes reproduction processing such as demodulation processing of an RF signal arising from reading of recorded information of the optical disc 2 by the optical pick-up 3.

The decode/error correction section 7 executes decode processing and error correction processing for the reproduction signal by the RF reproduction signal processor and data transmitted from a host device 9 such as a personal computer (PC) via the host interface 8.

It is obvious that this optical disc device (optical recording/reproducing device) is one example and the optical recording/reproducing device to which an embodiment of the present technique is applied is not limited to the configuration of FIG. 1.

<2. Configuration Example of Servo Control Device>

The configuration and functions of the servo control device 4 according to the present embodiment will be specifically described below.

Figure 2:
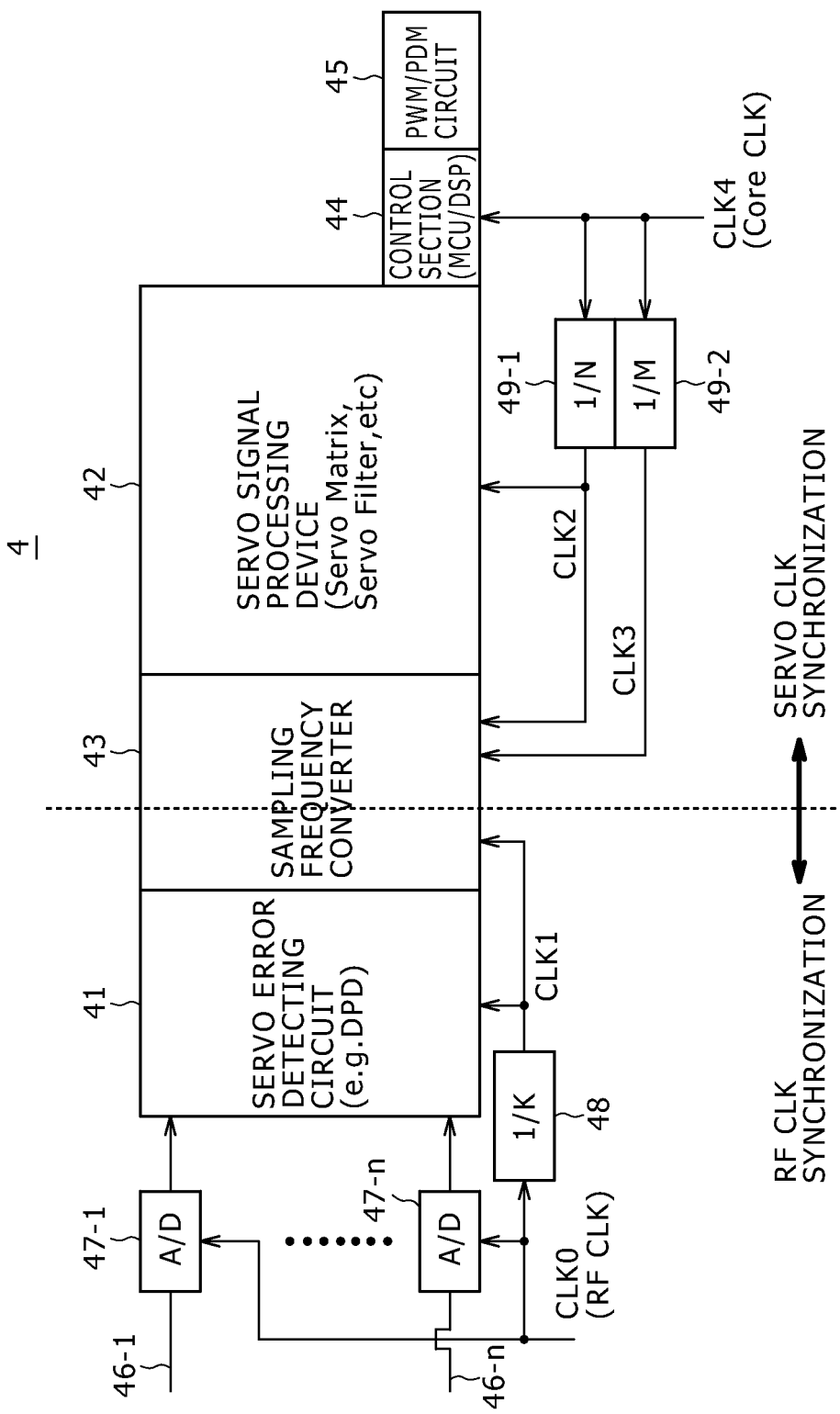
FIG. 2 is a diagram showing a configuration example of the servo control device according to the embodiment.

FIG. 2 is a diagram showing a configuration example of the servo control device according to the present embodiment.

As described above, the servo control device 4 has the servo error detecting circuit 41, the servo signal processing device 42 including a servo filter, the sampling frequency converter 43, the control section 44 such as MCU and DSP, and the PWM/PDM circuit 45 that carries out PWM (or PDM) control of the drive section 5.

The servo control device 4 further has plural reproduction channels 46-1 to 46-$n$, plural analog/digital (A/D) converters 47-1 to 47-$n$, and frequency dividers 48, 49-1, and 49-2.

In the servo control device 4, the A/D converters 47-1 to 47-$n$, the servo error detecting circuit 41, and the front-stage part of the sampling frequency converter 43 operate in synchronization with the RF system clock (CLK).

As described later, the A/D converters 47-1 to 47-$n$ operate in synchronization with a 0-th clock CLK0 (RF clock) and the servo error detecting circuit 41 and the front-stage part of the sampling frequency converter 43 operate in synchronization with a first clock CLK1.

In the servo control device 4, the back-stage part of the sampling frequency converter 43, the servo signal processing device 42, and the control section 44 operate in synchronization with the servo system clock.

As described later, the back-stage part of the sampling frequency converter 43 operates in synchronization with a second clock CLK2 and a third clock CLK3. The servo signal processing device 42 operates in synchronization with the second clock CLK2. The control section 44 operates in synchronization with a fourth clock CLK4.

The plural reproduction channels 46-1 to 46-$n$ are channels for reproducing read information from the optical disc 2 as a storage medium.

The A/D converters 47-1 to 47-$n$ perform sampling of plural input signals of the plural reproduction channels 46-1 to 46-$n$, respectively, to quantize and capture them.

The respective A/D converters 47-1 to 47-$n$ output the digitized signals to the servo error detecting circuit 41.

The servo error detecting circuit 41 executes predetermined processing for the plural input signals digitized by the A/D converters 47-1 to 47-$n$ to generate a phase difference signal $\Phi$ as a servo error signal.

The servo error detecting circuit 41 outputs the generated phase difference signal $\Phi$ to the sampling frequency converter 43.

In the servo control device 4 of FIG. 2, the A/D converters 47-1 to 47-$n$ are supplied with the 0-th clock CLK0 as a sampling clock and the servo error detecting circuit 41 is supplied with the first clock CLK1 as a processing clock.

The first clock CLK1 synchronizes with the 0-th clock CLK0 and the frequency of the first clock CLK1 is 1/K (K is an integer equal to or larger than 1) of the frequency of the 0-th clock CLK0.

In the configuration of FIG. 2, the frequency of the 0-th clock CLK0 is divided by the frequency divider 48 such that the first clock CLK1 is generated.

The sampling frequency converter 43 functions as a sampling rate converter (SRC) to convert the sampling frequency between the servo error detecting circuit 41 and the servo signal processing device 42.

The sampling frequency converter 43 processes the phase difference signal $\Phi$, which is the servo error signal by the servo error detecting circuit 41, in synchronization with the first clock CLK1.

The sampling frequency converter 43 processes the phase difference signal $\Phi$, which is the servo error detection signal processed in synchronization with the first clock CLK1, in synchronization with the second clock CLK2 to convert the sampling frequency.

The first clock CLK1 originates from the data reproduction system and the second clock CLK2 originates from the servo signal processing system. The first clock CLK1 is asynchronous with the second clock CLK2.

In the present embodiment, the recording medium is the optical disc 2 as a disk-like medium. The frequency of the first clock CLK1 is varied so as to be proportional to the product of the rotational speed of the optical disc (recording medium) 2 or the spindle (not shown) and the radius at the data reproduction position on the optical disc 2.

If the innermost circumference radius or the seeking start radius of the optical disc (disc-like medium) 2 is defined as ri and the outermost circumference radius or the seeking target radius is defined as ro, the frequency of the first clock CLK1 is at least 2*(ro/ri) times the maximum repetition frequency of the reproduction signal at the radius ri.

The sampling frequency converter 43 of the present embodiment is an asynchronous SRC and includes, in its front-stage part, an integrator or an accumulator that performs integration or accumulation synchronized with the first clock CLK1.

The back-stage part of the sampling frequency converter 43 is supplied with the second clock CLK2 as a clock.

Furthermore, the sampling frequency converter 43 is supplied with the third clock CLK 3 that determines the integration interval or the accumulation cycle of the integrator or the accumulator.

As described above, the fourth clock CLK4 as a core clock is supplied to the control section 44 on the side of the servo signal processing device 42. The frequency of the fourth clock CLK4 is equal to or higher than the frequency of the second clock CLK2 and the fourth clock CLK4 is in the synchronous relationship with the second clock CLK2 and the third clock CLK3.

In addition, the frequency of the second clock CLK2 is 1/N (N is an integer equal to or larger than 1) of the frequency of the fourth clock CLK4.

In the configuration of FIG. 2, the frequency of the fourth clock CLK4 is divided by the frequency divider 49-1 such that the second clock CLK2 is generated.

The frequency of the third clock CLK3 is 1/M (M is an integer equal to or larger than 2) of the frequency of the fourth clock CLK4.

In the configuration of FIG. 2, the frequency of the fourth clock CLK4 is divided by the frequency divider 49-2 such that the third clock CLK3 is generated.

The cycle of the third clock CLK3 is obtained by multiplying the processing cycle of the control section 44 (it is referred to as the period necessary to complete the series of task relating to the servo control) by an integer equal to or larger than 1.

<3. Configuration Example of Sampling Frequency Converter>

Figure 3:
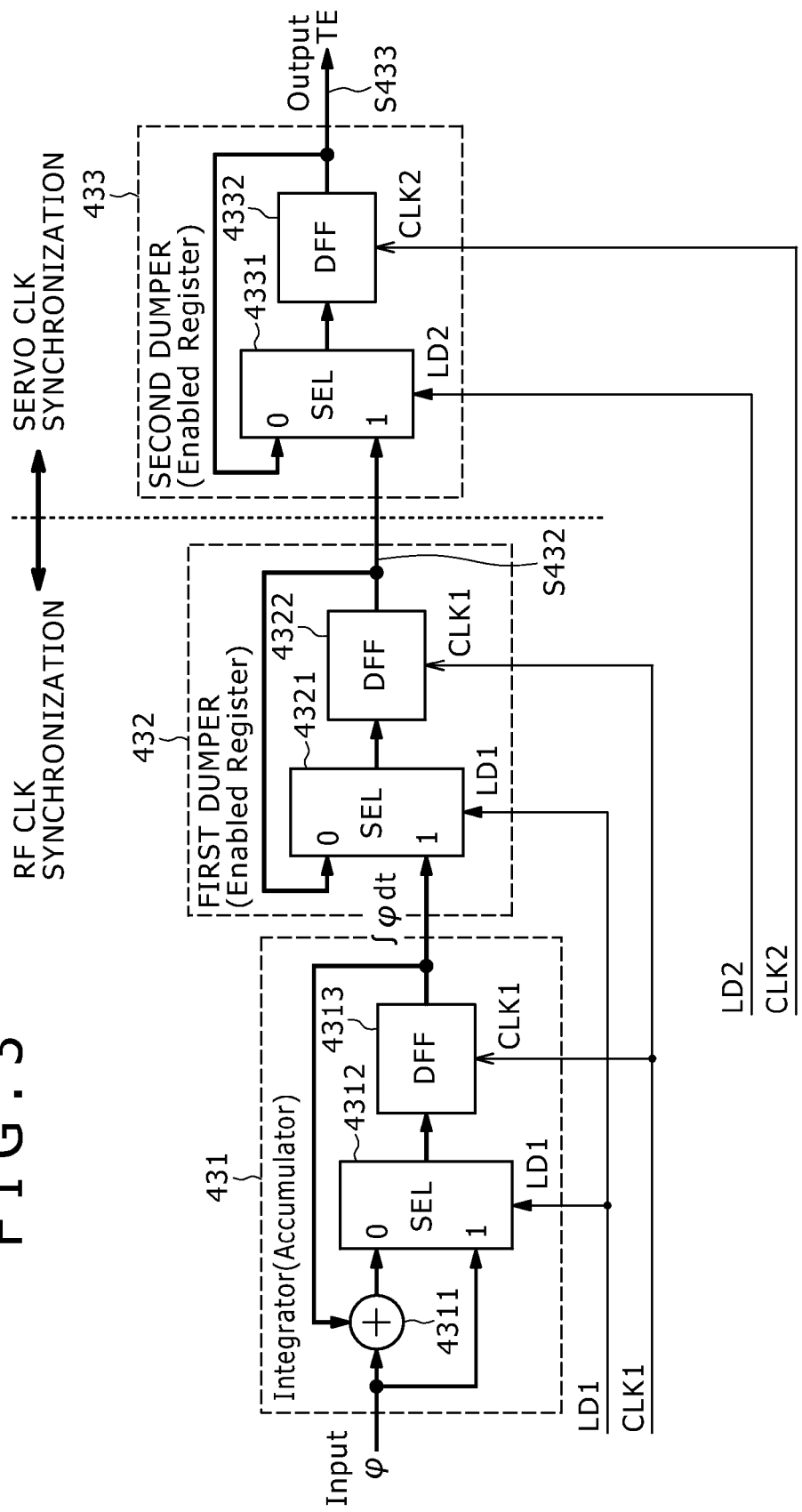
FIG. 3 is a diagram showing a configuration example of a sampling frequency converter according to the embodiment.

FIG. 3 is a diagram showing a configuration example of the sampling frequency converter 43 according to the present embodiment.

The sampling frequency converter 43 of FIG. 3 has an integrator (or accumulator) 431, a first dumper 432 as a first holding section, and a second dumper 433 as a second holding section.

In the sampling frequency converter 43, the integrator 431 and the first dumper 432 form the front-stage part of the sampling frequency converter 43 and operate in synchronization with the first clock CLK1 of the RF system clock (CLK).

In the sampling frequency converter 43, the second dumper 433 forms the back-stage part of the sampling frequency converter 43 and operates in synchronization with the second clock CLK2 of the servo system clock.

The integrator (or accumulator) 431 operates by the first clock CLK1. In addition, it holds and resets (initializes) the integration (or accumulation) result by a first enable signal LD1 and outputs the held result, e.g. an integration result ∫Φdt, to the first dumper 432.

The integrator (or accumulator) 431 performs the taking-in and resetting (initializing) simultaneously in parallel in response to the first enable signal LD1.

The integrator 431 in FIG. 3 has an adder 4311, a selector 4312, and a D-type flip-flop (DFF) 4313.

The adder 4311 adds the phase difference signal (servo error signal) Φ from the servo error detecting circuit 41 to the held data (latch data) of the DFF 4313 and outputs the addition result to the selector 4312.

When the first enable signal LD1 is at the high level, the selector 4312 selects the input phase difference signal Φ and outputs it to the DFF 4313 to reset (initialize) the DFF 4313.

When the first enable signal LD1 is at the low level, the selector 4312 selects the addition result of the adder 4311 and outputs it to the DFF 4313 to make the DFF 4313 hold the integration result (accumulation result).

The DFF 4313 holds the phase difference signal Φ or the addition result of the adder 4311 selected by the selector 4312 in synchronization with the first clock CLK1.

The DFF 4313 outputs the held data to the adder 4311 and the first dumper 432.

The first dumper 432 operates by the first clock CLK1 and temporarily captures the held integration or accumulation result of the integrator (or accumulator) 431 by the first enable signal LD1.

The first dumper 432 outputs the captured data to the second dumper 433 that operates in synchronization with the second clock CLK2, which is the servo system clock.

The first dumper 432 in FIG. 3 has a selector 4321 and a DFF 4322.

When the first enable signal LD1 is at the high level, the selector 4321 selects the input integration (accumulation) result ∫Φdt and makes the DFF 4322 hold it.

When the first enable signal LD1 is at the low level, the selector 4321 selects the output of the DFF 4322 and outputs it to the DFF 4322.

The DFF 4322 holds the integration (accumulation) result ∫Φdt or its own output selected by the selector 4321 in synchronization with the first clock CLK1.

The DFF 4322 outputs the held data as a signal 5432 to the selector 4321 and the second dumper 433.

The second dumper 433 operates by the second clock CLK2 synchronized with the fourth clock CLK4 and captures the integration or accumulation result of the integrator (or accumulator) 431, temporarily held in the first dumper 432, by a second enable signal LD2.

The second dumper 433 outputs the captured data to the servo signal processing device 42 that operates in synchronization with the second clock CLK2, which is the servo system clock.

The second dumper 433 in FIG. 3 has a selector 4331 and a DFF 4332.

When the second enable signal LD2 is at the high level, the selector 4331 selects the integration (accumulation) result ∫Φdt input as the signal 5432 and makes the DFF 4332 hold it.

When the second enable signal LD2 is at the low level, the selector 4331 selects the output of the DFF 4332 and outputs it to the DFF 4332.

The DFF 4332 holds the integration (accumulation) result ∫Φdt or its own output selected by the selector 4331 in synchronization with the second clock CLK2.

The DFF 4332 outputs the held data to the selector 4331 and outputs it as a TE signal 5433 to the servo signal processing device 42.

The first enable signal LD1 is obtained by performing digital differentiation of the rising or falling edge of the third clock CLK3 or both edges by the first clock CLK1.

The second enable signal LD2 is obtained by performing digital differentiation of the rising or falling edge of the third clock CLK3 or both edges by the second clock CLK2 (or fourth clock CLK4).

FIGS. 4A and 4B are diagrams showing a configuration example of generators of the first and second enable signals in the sampling frequency converter 43. FIG. 4A shows a first enable signal generator that generates the first enable signal LD1 and FIG. 4B shows a second enable signal generator that generates the second enable signal LD2.

As shown in FIG. 4A, a first enable signal generator 434 has DFFs 4341, 4342, and 4343 as latches and a gate circuit 4344.

The DFF 4341 latches (holds) the third clock CLK3 in synchronization with the first clock CLK1.

The DFF 4342 latches the output of the DFF 4341 in synchronization with the first clock CLK1.

The DFF 4343 latches the output of the DFF 4342 in synchronization with the first clock CLK1.

The gate circuit 4344 generates the first enable signal LD1 by logical operation between the output of the DFF 4342 supplied to the positive input and the output of the DFF 4343 supplied to the negative input.

That is, the first enable signal LD1 is obtained by performing digital differentiation of the rising or falling edge of the third clock CLK3 or both edges by the first clock CLK1.

As shown in FIG. 4B, a second enable signal generator 435 has DFFs 4351, 4352, and 4353 as latches and a gate circuit 4354.

The DFF 4351 latches (holds) the third clock CLK3 in synchronization with the second clock CLK2.

The DFF 4352 latches the output of the DFF 4351 in synchronization with the second clock CLK2.

The DFF 4353 latches the output of the DFF 4352 in synchronization with the second clock CLK2.

The gate circuit 4354 generates the second enable signal LD2 by logical operation between the output of the DFF 4352 supplied to the negative input and the output of the DFF 4353 supplied to the positive input.

That is, the second enable signal LD2 is obtained by performing digital differentiation of the rising or falling edge of the third clock CLK3 or both edges by the second clock CLK2 (or fourth clock CLK4).

FIGS. 5A to 5E are diagrams showing a waveform example of the first clock, the second clock, the third clock, the first enable signal, and the second enable signal used in the sampling frequency converter 43 according to the present embodiment.

FIG. 5A shows the first enable signal LD1. FIG. 5B shows the first clock CLK1. FIG. 5C shows the third clock CLK3. FIG. 5D shows the second enable signal LD2. FIG. 5E shows the second clock CLK2.

In the example of FIGS. 5A to 5E, the frequency of the first clock CLK1 is any and is 67 MHz as one example. The frequency of the second clock CLK2 is fixed at 33.333 MHz and the frequency of the third clock CLK3 is 347 kHz.

The first enable signal LD1 is obtained by performing digital differentiation of the rising edge of the third clock CLK3 by the second clock CLK2.

The second enable signal LD2 is obtained by performing digital differentiation of the falling edge of the third clock CLK3 by the second clock CLK2.

In the example of FIGS. 5A to 5E, in the sampling frequency converter 43, the front-stage part operates by the first clock CLK1 and the integration processing of the integrator 431 and capture processing by the first dumper 432 are executed in response to the first enable signal LD1.

Subsequently, in the sampling frequency converter 43, the back-stage part operates by the second clock CLK2 and the integration result is captured in response to the second enable signal LD2.

FIGS. 6A to 6D are diagrams showing the input/output waveforms of the respective sections in the sampling frequency converter according to the present embodiment.

FIG. 6A shows the RF signal by the optical pick-up 3 and FIG. 6B shows the phase difference signal Φ as the input to the integrator 431 of the sampling frequency converter 43. FIG. 6C shows the output signal ∫Φ(t)dt of the integrator 431 and FIG. 6D shows the TE signal as the output of the first dumper 432 and the second dumper 433.

As shown in FIGS. 6A to 6D, the RF signal by the optical pick-up 3 is input to the servo error detecting circuit 41 and the phase difference signal Φ is generated to be input to the integrator 431 of the sampling frequency converter 43.

The phase difference signal Φ is subjected to integration by the integrator 431 and the result is temporarily held by the first dumper 432 in response to the first enable signal LD1 synchronized with the first clock CLK1. Subsequently, frequency conversion is performed in response to the second enable signal LD2 synchronized with the second clock CLK2 and the result is held by the second dumper 433, so that a favorable TE signal is obtained.

The servo signal processing device 42 includes a servo matrix and a servo filter and operates by the second clock CLK2, which is the servo system clock. It executes predetermined processing for the TE signal as the servo error signal to generate a control signal S42 for servo system control.

The servo signal processing device 42 outputs the generated control signal S42 to the control section 44 and the PWM circuit 45.

As described above, the fourth clock CLK4 is supplied as the core clock to the control section 44 on the side of the servo signal processing device 42. The frequency of the fourth clock CLK4 is equal to or higher than the frequency of the second clock CLK2 and the fourth clock CLK4 is in the synchronous relationship with the second clock CLK2 and the third clock CLK3.

In addition, the frequency of the second clock CLK2 is 1/N (N is an integer equal to or larger than 1) of the frequency of the fourth clock CLK4.

In the configuration of FIG. 2, the frequency of the fourth clock CLK4 is divided by the frequency divider 49-1 such that the second clock CLK2 is generated to be supplied to the servo signal processing device 42.

<4. Configuration Example of TE Detecting Circuit of DPD System>

A configuration example of a tracking error (TE) detecting circuit of a DPD system will be described below.

In the optical disc device 1 of the present embodiment, for example the servo error detecting circuit 41 is so configured as to include the TE detecting circuit of the DPD system.

The TE detecting circuit of the DPD system includes a correlator and the correlator includes an integrator.

Furthermore, the integrator of the TE detecting circuit and the integrator (accumulator) of the sampling frequency converter 43 are integrated and shared.

Figure 7:
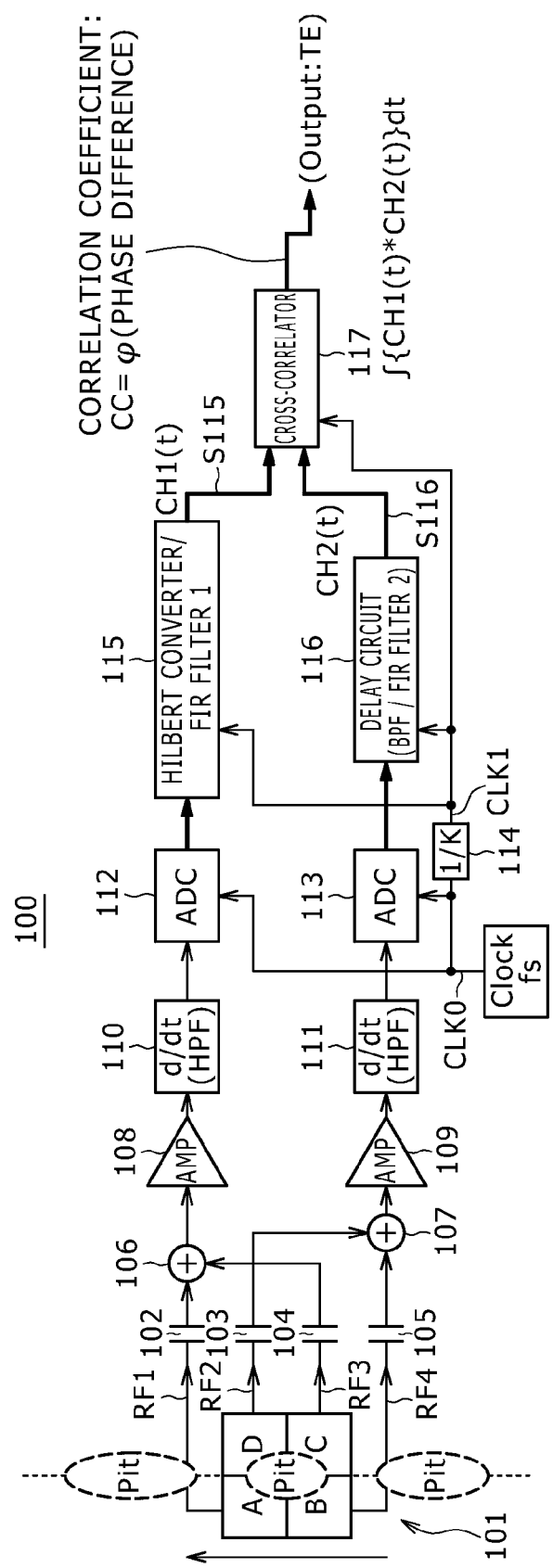
FIG. 7 is a circuit diagram showing a configuration example of a tracking error (TE) detecting circuit employing a DPD system according to the embodiment.

FIG. 7 is a circuit diagram showing a configuration example of a tracking error (TE) detecting circuit employing the DPD system according to the present embodiment.

A TE detecting circuit 100 according to the present embodiment has a light receiving element 101 disposed in the optical pick-up (OPU) 3 of the optical disc device 1 for example.

The TE detecting circuit 100 has a first alternative current (AC) coupler 102, a second AC coupler 103, a third AC coupler 104, a fourth AC coupler 105, a first adder 106, and a second adder 107.

The TE detecting circuit 100 has a first amplifier (AMP) 108, a second amplifier 109, a first differentiator 110, a second differentiator 111, a first A/D converter (ADC) 112, a second A/D converter 113, and a frequency divider 114.

The TE detecting circuit 100 has a Hilbert converter 115, a delay circuit 116, and a cross-correlator 117.

Of these constituent elements, the first AC coupler 102, the third AC coupler 104, the first adder 106, the first amplifier 108, and the first differentiator 110 form the reproduction channel 46-1 among the plural reproduction channels in FIG. 2.

Similarly, the second AC coupler 103, the fourth AC coupler 105, the second adder 107, the second amplifier 109, and the second differentiator 111 form the reproduction channel 46-2 (n=2) among the plural reproduction channels in FIG. 2.

That is, in the example of FIG. 7, the reproduction channels are two channels CH1 and CH2.

The A/D converter 112 is equivalent to the A/D converter 47-1 in FIG. 2. The A/D converter 113 is equivalent to the A/D converter 47-2 (n=2) in FIG. 2. The frequency divider 114 is equivalent to the frequency divider 48 in FIG. 2.

Furthermore, the servo error detecting circuit 41 in FIG. 2 is so formed as to include the Hilbert converter 115, the delay circuit 116, and the cross-correlator 117 for example.

The light receiving element 101 is divided into quarters. A divided light receiving element 101-A outputs a first RF signal RF1 to the first AC coupler 102 and a divided light receiving element 101-B outputs a fourth RF signal RF4 to the fourth AC coupler 105.

A divided light receiving element 101-C outputs a third RF signal RF3 to the third AC coupler 104 and a divided light receiving element 101-D outputs a second RF signal RF2 to the second AC coupler 103.

The first to fourth AC couplers 102 to 105 are each configured by e.g. a capacitor.

The first to fourth AC couplers 102 to 105 remove the direct current (DC) component of the first, second, third, and fourth RF signals RF1 to RF4, respectively, which are output from the light receiving element 101 of the optical pick-up (OPU) and have the mutual phase difference (time difference) that changes depending on the tracking error.

The first adder 106 adds the first RF signal RF1 from which the DC component is removed by the first AC coupler 102 and the third RF signal RF3 from which the DC component is removed by the third AC coupler 104 and outputs the addition result to the first amplifier 108.

The second adder 107 adds the second RF signal RF2 from which the DC component is removed by the second AC coupler 103 and the fourth RF signal RF4 from which the DC component is removed by the fourth AC coupler 105 and outputs the addition result to the second amplifier 109.

The first amplifier 108 amplifies the output of the first adder 106 to a predetermined level and outputs the amplification result to the first differentiator 110.

The second amplifier 109 amplifies the output of the second adder 107 to a predetermined level and outputs the amplification result to the second differentiator 111.

The first amplifier 108 and the second amplifier 109 give an overscale effect to the inputs of the A/D converters 112 and 113 at the subsequent stage.

The gain of the first amplifier 108 and the second amplifier 109 is so set that the input amplitude of the A/D converters 112 and 113 becomes amplitude exceeding the full-scale.

The purpose thereof is to remove the amplitude variation component by using the overscale limit effect of the A/D converter and effectively utilize the quantization resolution to use an A/D converter of a low bit number. In an equivalent sense, the quantization resolution is allocated only to the vicinity of the zero cross, which is important regarding extraction of phase difference information.

The first differentiator 110 removes the DC component of the output of the first amplifier 108 and performs differentiation to output the result to the first A/D converter 112.

The second differentiator 111 removes the DC component of the output of the second amplifier 109 and performs differentiation to output the result to the second A/D converter 113.

The first differentiator 110 and the second differentiator 111 remove the DC offset existing in the part to the previous stage. In addition, they give the differential characteristic and improve the demodulation signal to noise (S/N) ratio of the subsequent-stage phase demodulator whose detection sensitivity has the differential characteristic. The first differentiator 110 and the second differentiator 111 can be each configured by a first-order high-pass filter (HPF).

The first A/D converter 112 performs amplification limiting, sampling, and quantization of the output of the first differentiator 110 and outputs the result to the Hilbert converter 115.

The second A/D converter 113 performs amplification limiting, sampling, and quantization of the output of the second differentiator 111 and outputs the result to the delay circuit 116.

The first A/D converter 112 and the second A/D converter 113 are driven by the 0-th clock CLK0 as the same sampling clock.

This 0-th clock CLK0 as the sampling clock may be asynchronous with the RF.

It is preferable that the sampling frequency of the A/D converters 112 and 113 be set as follows if the innermost circumference radius or the seeking start radius of the optical disc 2 as a recording medium is defined as ri and the outermost circumference radius or the seeking target radius is defined as ro and a relationship of [ro>ri] is satisfied.

Specifically, it is preferable that the sampling frequency be set higher than 2*(ro/ri) times (4.8 times, for 12-cm disc) the RF maximum repetition frequency at the radius ri (2T=fcck/4 for Blu-ray, 3T=fcck/6 for DVD/CD, fcck: channel clock frequency).

The purpose thereof is to properly detect the TE signal also in full-seeking operation from the innermost circumference to the outermost circumference of the disc.

The frequency divider 114 divides the frequency fs of the 0-th clock CLK0 to 1/K to generate the first clock CLK1 with the frequency fs/K and supply it to the Hilbert converter 115 and the delay circuit 116.

The Hilbert converter 115 is supplied with the first clock CLK1 as the processing clock. It shifts the phase of the output of the first A/D converter 112 by 90 degrees irrespective of the cycle of the signal component and outputs the result as a signal 5115 to the cross-correlator 117 as a phase comparator.

The delay circuit 116 delays the output of the second A/D converter 113 in such a manner that the amount of delay corresponds with that of delay by the Hilbert converter 115, and outputs the result as a signal 5116 to the cross-correlator 117.

The delay circuit 116 can be configured by a band-pass filter (BPF) having the amplitude-frequency characteristic equal to that of the Hilbert converter 115.

It is also possible to employ a configuration in which a first FIR filter and a second FIR filter are included instead of the Hilbert converter and the BPF of the delay circuit, respectively, and the phase difference between the output signals of the first and second FIR filters is 90 degrees irrespective of the signal cycle.

In particular, it is possible to employ a configuration in which the amount of phase shift of the first FIR filter is +45 degrees (or −45 degrees) irrespective of the signal cycle and the amount of phase shift of the second FIR filter is −45 degrees (or +45 degrees) irrespective of the signal cycle.

The cross-correlator 117 calculates a correlation coefficient CC representing the phase difference of the input RF signal by the output of the Hilbert converter 115 and the output of the delay circuit 116, and outputs the result as the phase difference signal Φ.

Figure 8:
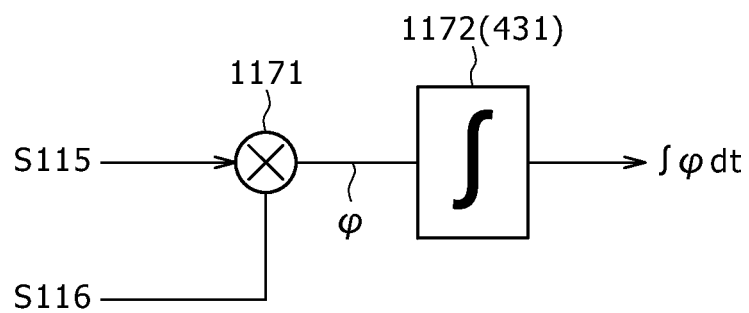
FIG. 8 is a circuit diagram showing a configuration example of a correlator according to the embodiment.

FIG. 8 is a circuit diagram showing a configuration example of the correlator according to the present embodiment.

The correlator 117 of FIG. 8 includes a multiplier 1171 and an integrator (or accumulator) 1172.

The multiplier 1171 multiplies the output signal S115 of the Hilbert converter 115 and the output signal S116 of the delay circuit 116, captured in synchronization with the first clock CLK1, to generate the phase difference signal Φ as the servo error detection signal and output it to the integrator 1172.

In the present embodiment, the correlator 117 in the TE detecting circuit 100 of the DPD system includes the integrator 1172 and this integrator (or accumulator) 1172 of the correlator 117 and the integrator (or accumulator) 431 of the sampling frequency converter 43 are integrated and shared.

This shared integrator 1172 (431) has a configuration similar to that of FIG. 3 for example.

The shared integrator 1172 (431) operates by the first clock CLK1. In addition, it holds and resets (initializes) the integration (or accumulation) result by the first enable signal LD1 and outputs the held result, e.g. the integration result ∫Φdt, to the first dumper 432 (FIG. 3).

The above-described TE detecting circuit 100 can be applied to e.g. an optical recording/reproducing device (optical disc device) for the Blu-ray disc or the like, incorporating a semiconductor laser of a wavelength in the 400-nm band.

Operation by the configuration employing the above-described DPD system will be described below.

Information reading light from the optical disc 2 is divided into quarters by the light receiving element 101. The first RF signal RF1 is output from the divided light receiving element 101-A to the first AC coupler 102 and the fourth RF signal RF4 is output from the divided light receiving element 101-B to the fourth AC coupler 105.

Similarly, the third RF signal RF3 is output from the divided light receiving element 101-C to the third AC coupler 104 and the second RF signal RF2 is output from the divided light receiving element 101-D to the second AC coupler 103.

In the first to fourth AC couplers 102 to 105, the DC component of the first, second, third, and fourth RF signals RF1 to RF4, respectively, which are output from the light receiving element 101 of the optical pick-up (OPU) and have the mutual phase difference (time difference) that changes depending on the tracking error, is removed.

Then, in the first adder 106, the first RF signal RF1 from which the DC component is removed by the first AC coupler 102 and the third RF signal RF3 from which the DC component is removed by the third AC coupler 104 are added. The addition result is subject to amplification action by the first amplifier 108 to be output to the first differentiator 110.

Furthermore, in the second adder 107, the second RF signal RF2 from which the DC component is removed by the second AC coupler 103 and the fourth RF signal RF4 from which the DC component is removed by the fourth AC coupler 105 are added. The addition result is subject to amplification action by the second amplifier 109 to be output to the second differentiator 111.

In the first differentiator 110, the DC component of the output of the first amplifier 108 is removed and differentiation is performed, so that the result is output to the first A/D converter 112. In the second differentiator 111, the DC component of the output of the second amplifier 109 is removed and differentiation is performed, so that the result is output to the second A/D converter 113.

Then, in the first A/D converter 112, the output of the first differentiator 110 is subjected to amplitude limiting, sampling, and quantization action in synchronization with the 0-th clock CLK0, which is the RF system clock, and the result is output as a digital signal to the Hilbert converter 115.

Similarly, in the second A/D converter 113, the output of the second differentiator 111 is subjected to amplitude limiting, sampling, and quantization action in synchronization with the 0-th clock CLK0, and the result is output as a digital signal to the delay circuit 116.

In the Hilbert converter 115, the phase of the output of the first A/D converter 112 is shifted by 90 degrees irrespective of the cycle of the signal component and the result is output to the cross-correlator 117.

In the delay circuit 116, the output of the second A/D converter 113 is so delayed that the amount of delay corresponds with that of delay by the Hilbert converter 115 and the result is output to the cross-correlator 117.

In the cross-correlator 117, the correlation coefficient CC representing the phase difference of the input RF signal is calculated by the output of the Hilbert converter 115 and the output of the delay circuit 116. Then, the result is output as the phase difference signal Φ to the shared integrator 1172 (431) integrated so as to be shared by the cross-correlator 117 and the sampling frequency converter 43.

In the shared integrator 1172 (431), operation is carried out by the first clock CLK1 and the integration (or accumulation) result is held and reset (initialized) by the first enable signal LD1. Then, the held result, e.g. the integration result ∫Φdt, is output to the first dumper 432 (FIG. 3).

In the first dumper 432 of the sampling frequency converter 43, operation is carried out by the first clock CLK1 and the held integration or accumulation result of the integrator (or accumulator) 431 is temporarily captured by the first enable signal LD1.

In the first dumper 432, the captured data is output to the second dumper 433, which operates in synchronization with the second clock CLK2 as the servo system clock.

In the second dumper 433, operation is carried out by the second clock CLK2 synchronized with the fourth clock CLK4 and the integration or accumulation result of the integrator (or accumulator) 431 temporarily held in the first dumper 432 is captured by the second enable signal LD2.

In the second dumper 433, the captured data is output as the TE signal to the servo signal processing device 42, which operates in synchronization with the second clock CLK2 as the servo system clock.

In this manner, in the sampling frequency converter 43, the sampling frequency is converted between the servo error detecting circuit 41 and the servo signal processing device 42.

Specifically, in the sampling frequency converter 43, the phase difference signal Φ as the servo error signal by the servo error detecting circuit 41 is processed in synchronization with the first clock CLK1.

In the sampling frequency converter 43, the signal resulting from the processing in synchronization with the first clock CLK1 is processed in synchronization with the second clock CLK2, so that the sampling frequency is converted.

In the servo signal processing device 42, operation is carried out by the second clock CLK2, which is the servo system clock, and predetermined processing is executed for the TE signal to generate the control signal S42 for servo system control. The generated control signal S42 is output to the control section 44 and the PWM circuit 45.

Then, under control by the control section 44, the drive section 5 is driven by the PWM circuit 45 and the tracking mechanism section of the objective lens 34 of the optical pick-up 3 is driven by the tracking driver 51.

As described above, in the optical disc device 1 of the present embodiment, a variable-frequency clock is employed as the clock for the A/D converters in the servo input system and the servo error detecting circuit 41 and a fixed-frequency clock is employed as the clock of the servo control system.

Furthermore, in the servo control device 4 of the present embodiment, the sampling frequency converter 43 as an asynchronous sample rate converter (ASRC) is inserted between the servo error detecting circuit 41 and the servo signal processing device 42 (between both clock domains) so as to receive and pass the servo error signal.

In particular, the servo control device 4 has the servo error detecting circuit 41 utilizing correlation detection and an asynchronous integrator is employed as the integrator as a constituent element of the correlator. This can configure an ASRC equivalently with sufficient accuracy necessary for servo control without increasing the hardware scale.

Furthermore, even if the system is compatible with the CAV system, the high-speed clock operating section is limited to only the servo error detecting circuit 41. This can avoid increase in the power consumption attributed to setting the frequency of the clock of the whole servo system high.

Moreover, by using the processing clock of the RF system (data reproduction system) as the variable-frequency clock for the A/D converters and the servo error detecting circuit, the sampling frequency of the RF system is so set as to invariably satisfy the sampling theorem with respect to rmtr (RF signal).

Therefore, the frequency setting of the servo error detecting circuit regarding the CAV system does not need to be managed on the servo firmware (FW) side and the burden in development of the servo FW is reduced.

It is obvious that this optical disc device is one example and the optical recording/reproducing device to which an embodiment of the present technique is applied is not limited to the configuration of FIG. 1.

The present technique can take also the following configurations.

(1) A servo control device including
a plurality of reproduction channels configured to reproduce information of a recording medium,
a plurality of analog/digital (A/D) converters configured to perform sampling and quantization of a plurality of input signals of the plurality of reproduction channels, correspondingly,
a servo error detecting circuit configured to execute predetermined processing for the plurality of input signals digitized by the A/D converters to generate a servo error signal,
a servo signal processing device configured to execute predetermined processing for the servo error signal to generate a control signal for servo system control, and
a sampling frequency converter configured to convert a sampling frequency between the servo error detecting circuit and the servo signal processing device,
wherein
a first clock is included as a sampling clock of the A/D converters and a processing clock of the servo error detecting circuit,
a second clock is included as a processing clock of the servo signal processing device, and
the sampling frequency converter converts the sampling frequency by processing the servo error signal by the servo error detecting circuit in synchronization with the first clock and processing the signal processed in synchronization with the first clock in synchronization with the second clock.

(2) The servo control device according to the above-described (1), wherein
the first clock originates from a data reproduction system,
the second clock originates from a servo signal processing system, and
the first clock is asynchronous with the second clock.

(3) The servo control device according to the above-described (1) or (2), wherein
the sampling frequency converter is an asynchronous type and includes an integrator or an accumulator that performs integration or accumulation synchronized with the first clock.

(4) The servo control device according to any one of the above-described (1) to (3), wherein
the recording medium is a disk-like medium, and
frequency of the first clock is varied so as to be proportional to a product of rotational speed of the recording medium or a spindle and a radius at a data reproduction position on the recording medium.

(5) The servo control device according to the above-described (4), wherein
if an innermost circumference radius or a seeking start radius of the disk-like medium is defined as ri and an outermost circumference radius or a seeking target radius is defined as ro, the frequency of the first clock is at least $2*(ro/ri)$ times a maximum repetition frequency of a reproduction signal at the radius ri.

(6) The servo control device according to any one of the above-described (1) to (5), wherein
the recording medium is an optical disc, and
the servo error detecting circuit includes a tracking error (TE) detecting circuit of a differential phase detection (DPD) system.

(7) The servo control device according to the above-described (6), wherein
the TE detecting circuit of the DPD system includes a correlator and the correlator includes an integrator,
the sampling frequency converter is an asynchronous type and includes an integrator or an accumulator that performs integration or accumulation synchronized with the first clock, and
the integrator of the TE detecting circuit and the integrator or the accumulator of the sampling frequency converter are integrated and shared.

(8) The servo control device according to any one of the above-described (1) to (7), wherein
the servo signal processing device includes a control section that carries out drive control of a servo system,
the control section is supplied with a fourth clock as a core clock,
frequency of the fourth clock is not smaller than frequency of the second clock, and
the fourth clock is in a synchronous relationship with the second clock.

(9) The servo control device according to any one of the above-described (1) to (8), wherein
the A/D converters are supplied with a 0-th clock as a sampling clock,
the servo error detecting circuit is supplied with the first clock as a processing clock, the sampling frequency converter is an asynchronous type and includes an integrator or an accumulator that performs integration or accumulation synchronized with the first clock, the sampling frequency converter is supplied with the second clock as a clock and is supplied with a third clock that determines an integration interval or an accumulation cycle of the integrator or the accumulator, the servo signal processing device includes a control section that carries out drive control of a servo system and is supplied with the second clock as a clock, a fourth clock is supplied as a core clock of the control section, the first clock synchronizes with the 0-th clock and frequency of the first clock is 1/K (K is an integer not smaller than 1) of frequency of the 0-th clock, the second clock and the third clock synchronize with the fourth clock and frequency of the second clock is 1/N (N is an integer not smaller than 1) of frequency of the fourth clock, frequency of the third clock is 1/M (M is an integer not smaller than 2) of the frequency of the fourth clock, and a cycle of the third clock is obtained by multiplying a processing cycle of the control section by an integer not smaller than 1.

(10) The servo control device according to the above-described (9), wherein the sampling frequency converter includes a holding section that captures an integration or accumulation result of the integrator or the accumulator, the integrator or the accumulator operates by the first clock and holds and resets (initializes) the integration or accumulation result by a first enable signal, the holding section operates by the second clock or the fourth clock and captures the held integration or accumulation result by a second enable signal, the first enable signal is obtained by performing digital differentiation of a rising or falling edge of the third clock or both edges by the first clock, and the second enable signal is obtained by performing digital differentiation of the rising or falling edge of the third clock or both the edges by the second clock or the fourth clock.

(11) An optical disc device including a plurality of reproduction channels configured to reproduce information of an optical disc by an optical section, a plurality of analog/digital (A/D) converters configured to perform sampling and quantization of a plurality of input signals of the plurality of reproduction channels, correspondingly, a servo error detecting circuit configured to execute predetermined processing for the plurality of input signals digitized by the A/D converters to generate a servo error signal, a servo signal processing device configured to execute predetermined processing for the servo error signal to generate a control signal for servo system control, and a sampling frequency converter configured to convert a sampling frequency between the servo error detecting circuit and the servo signal processing device, wherein a first clock is included as a sampling clock of the A/D converters and a processing clock of the servo error detecting circuit, a second clock is included as a processing clock of the servo signal processing device, and the sampling frequency converter converts the sampling frequency by processing the servo error signal by the servo error detecting circuit in synchronization with the first clock and processing the signal processed in synchronization with the first clock in synchronization with the second clock.

The present application contains subject matter related to that disclosed in Japanese Priority Patent Application JP 2011-165789 filed in the Japan Patent Office on Jul. 28, 2011, the entire content of which is hereby incorporated by reference.

What is claimed is:

1. A servo control device comprising:
a plurality of reproduction channels configured to reproduce information of a recording medium;
a plurality of analog/digital converters configured to perform sampling and quantization of a plurality of input signals of the plurality of reproduction channels, correspondingly;
a servo error detecting circuit configured to execute predetermined processing for the plurality of input signals digitized by the A/D converters to generate a servo error signal;
a servo signal processing device configured to execute predetermined processing for the servo error signal to generate a control signal for servo system control; and
a sampling frequency converter configured to convert a sampling frequency between the servo error detecting circuit and the servo signal processing device,
wherein
a first clock is included as a sampling clock of the A/D converters and a processing clock of the servo error detecting circuit,
a second clock is included as a processing clock of the servo signal processing device, and
the sampling frequency converter converts the sampling frequency by processing the servo error signal by the servo error detecting circuit in synchronization with the first clock and processing the signal processed in synchronization with the first clock in synchronization with the second clock.

2. The servo control device according to claim 1, wherein the first clock originates from a data reproduction system, the second clock originates from a servo signal processing system, and
the first clock is asynchronous with the second clock.

3. The servo control device according to claim 1, wherein the sampling frequency converter is an asynchronous type and includes an integrator or an accumulator that performs integration or accumulation synchronized with the first clock.

4. The servo control device according to claim 1, wherein the recording medium is a disk-like medium, and
frequency of the first clock is varied so as to be proportional to a product of rotational speed of the recording medium or a spindle and a radius at a data reproduction position on the recording medium.

5. The servo control device according to claim 4, wherein if an innermost circumference radius or a seeking start radius of the disk-like medium is defined as ri and an outermost circumference radius or a seeking target radius is defined as ro, the frequency of the first clock is at least 2*(ro/ri) times a maximum repetition frequency of a reproduction signal at the radius ri.

6. The servo control device according to claim 1, wherein the recording medium is an optical disc, and
the servo error detecting circuit includes a tracking error detecting circuit of a differential phase detection system.

7. The servo control device according to claim 6, wherein the tracking error detecting circuit of the differential phase detection system includes a correlator and the correlator includes an integrator, the sampling frequency converter is an asynchronous type and includes an integrator or an accumulator that performs integration or accumulation synchronized with the first clock, and the integrator of the tracking error detecting circuit and the integrator or the accumulator of the sampling frequency converter are integrated and shared.

8. The servo control device according to claim 1, wherein the servo signal processing device includes a control section that carries out drive control of a servo system, the control section is supplied with a fourth clock as a core clock, frequency of the fourth clock is not smaller than frequency of the second clock, and the fourth clock is in a synchronous relationship with the second clock.

9. The servo control device according to claim 1, wherein the A/D converters are supplied with a 0-th clock as a sampling clock, the servo error detecting circuit is supplied with the first clock as a processing clock, the sampling frequency converter is an asynchronous type and includes an integrator or an accumulator that performs integration or accumulation synchronized with the first clock, the sampling frequency converter is supplied with the second clock as a clock and is supplied with a third clock that determines an integration interval or an accumulation cycle of the integrator or the accumulator, the servo signal processing device includes a control section that carries out drive control of a servo system and is supplied with the second clock as a clock, a fourth clock is supplied as a core clock of the control section, the first clock synchronizes with the 0-th clock and frequency of the first clock is 1/K of frequency of the 0-th clock, K being an integer not smaller than 1, the second clock and the third clock synchronize with the fourth clock and frequency of the second clock is 1/N of frequency of the fourth clock, N being an integer not smaller than 1, frequency of the third clock is 1/M of the frequency of the fourth clock, M being an integer not smaller than 2, and a cycle of the third clock is obtained by multiplying a processing cycle of the control section by an integer not smaller than 1.

10. The servo control device according to claim 9, wherein the sampling frequency converter includes a holding section that captures an integration or accumulation result of the integrator or the accumulator, the integrator or the accumulator operates by the first clock and holds and resets or initializes the integration or accumulation result by a first enable signal, the holding section operates by the second clock or the fourth clock and captures the held integration or accumulation result by a second enable signal, the first enable signal is obtained by performing digital differentiation of a rising or falling edge of the third clock or both edges by the first clock, and the second enable signal is obtained by performing digital differentiation of the rising or falling edge of the third clock or both the edges by the second clock or the fourth clock.

11. An optical disc device comprising:

a plurality of reproduction channels configured to reproduce information of an optical disc by an optical section;

a plurality of analog/digital converters configured to perform sampling and quantization of a plurality of input signals of the plurality of reproduction channels, correspondingly;

a servo error detecting circuit configured to execute predetermined processing for the plurality of input signals digitized by the A/D converters to generate a servo error signal;

a servo signal processing device configured to execute predetermined processing for the servo error signal to generate a control signal for servo system control; and a sampling frequency converter configured to convert a sampling frequency between the servo error detecting circuit and the servo signal processing device, wherein a first clock is included as a sampling clock of the A/D converters and a processing clock of the servo error detecting circuit, a second clock is included as a processing clock of the servo signal processing device, and the sampling frequency converter converts the sampling frequency by processing the servo error signal by the servo error detecting circuit in synchronization with the first clock and processing the signal processed in synchronization with the first clock in synchronization with the second clock.

* * * * *